DATA TRANSMISSION AMPLIFIER

Filed Nov. 23, 1964

INVENTORS
JOHN E. BOUGHTWOOD
BY HAROLD HARRIS
J. B. Burke
ATTORNEY

United States Patent Office 3,363,191
Patented Jan. 9, 1968

3,363,191

DATA TRANSMISSION AMPLIFIER

John E. Boughtwood, Halsite, and Harold Harris, Huntington Station, N.Y., assignors to The Western Union Telegraph Company, New York, N.Y., a corporation of New York Filed Nov. 23, 1964, Ser. No. 413,038
8 Claims. (Cl. 330—17)

ABSTRACT OF THE DISCLOSURE

A solid state data transmission amplifier network useful as a telegraphic loop driver receiving a grounded input of plus or minus 24 volts from a symmetrical ground to a balanced ungrounded loop. The amplifier includes a bridge circuit having two pairs of cascaded transistor stages which produce polarity reversals across a pair of terminals from a center-tapped battery while maintaining equal impedances between the respective terminals and the center tap. The network includes mark-hold and space-hold facilities.

This invention concerns a transistorized data transmission amplifier having a grounded D-C input and sensing keyed amplified D-C signals from a symmetrical ground to an ungrounded balanced loop.

The invention is useful as a telegraph loop driver, and may serve as the output keying amplifier at the transmission end of a data transmission terminal data transmitter, transceiver, etc.

Interference with voice and other data circuits in a common cable, and signal distortion due to attenuation in a keyed polar signal transmission system become objectionable at operating rates of 100 bauds and higher. These conditions have been attributable to a considerable extent to the common grounded circuit configurations used in such systems; and to inductive and capacitive transfer of high frequency components of high speed signals between conductors due to imperfect balance of the paired conductors with respect to each other and with respect to ground.

The present invention is directed at minimizing poor reception experienced at keyed data receiving terminals due to the interference and signal distortion conditions mentioned. According to the invention there is provided a keyed transmitting amplifier circuit having a balanced configuration connected to a cable loop. The termination at the distant receiving terminal of the cable loop may be ungrounded. Transmitting batteries locally balanced to ground are applied in opposite polarity to the cable loop. For marking signals, one conductor of the loop is negative and the other is positive. For spacing signals the one conductor is positive and the other conductor is negative. The batteries referenced to ground may be 24-volt power supplies which are switched or reversed for marking and spacing signal transmission respectively in the circuit embodying the invention. The circuit includes a bridge type of driver circuit which provides polarity reversals for the ungrounded metallic cable loop, the bridge being driven by a balanced stage employing a single grounded polarized input, which may be 12-volts positive for spacing and 12-volts negative for marking. Identical impedances are provided from each cable conductor terminal to ground only through the transmitter amplifier circuit. This minimizes the radiation of induced voltages to other cable pairs along the length of cable loop, and also minimizes transverse interfering voltages and currents.

One object of the invention is to provide a transistorized data transmission amplifier which acts as an electronic double-pole double-throw switch to reverse a grounded center-tapped local D-C supply voltage, the switch being keyed by a D-C polar input voltage to reverse the loop connection of the local supply voltage.

Another object is to provide a data transmission or keying amplifier as described with switching facilities for selectively maintaining a positive or negative voltage line condition with respect to ground at its respective output terminals.

Another object is to provide a keying amplifier circuit which maintains constant impedance to ground while applying polarity reversals to an outgoing loop.

A further object is to provide a transistorized data transmission amplifier as described working into a two-wire cable loop, in which signal interference between adjacent cable pairs and signal distortion due to cable attenuation are minimized.

Another object is to provide a transistorized data transmission amplifier as described which can be made up as a miniature data transmitter module.

The invention will be better understood from the following detailed description taken together with the drawing, wherein.

Figure 1:
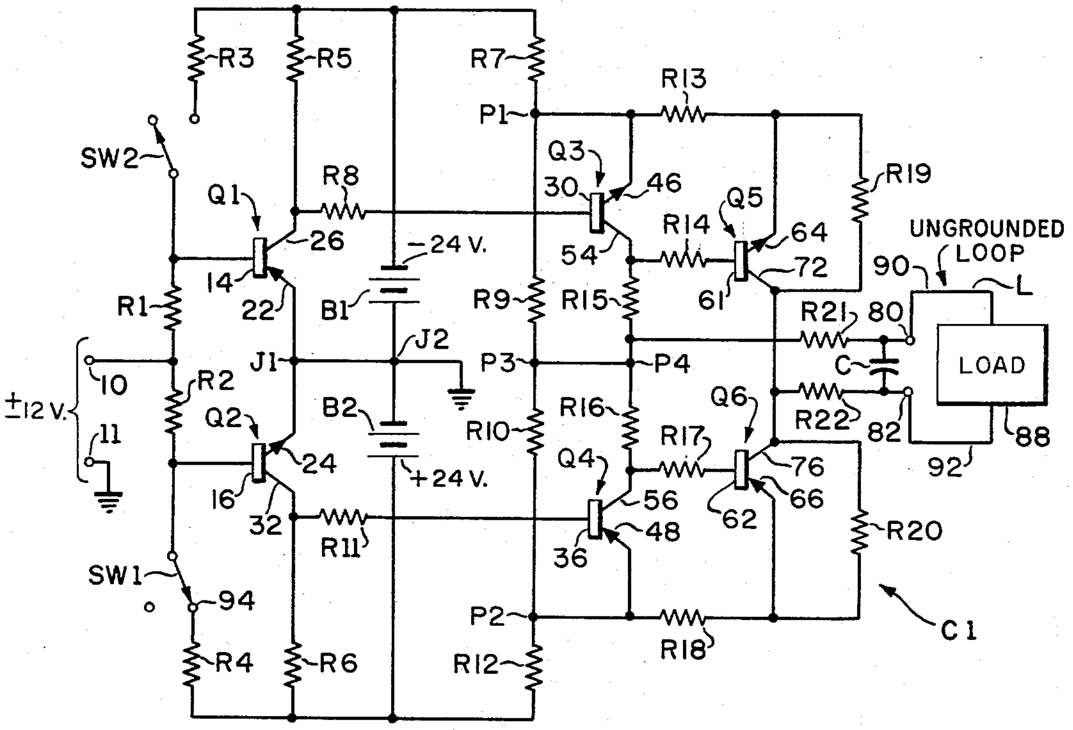
FIG. 1 is a diagram of an electric circuit embodying the invention.

Referring to FIG. 1, the transmitter amplifier circuit C1 shown has input terminals 10, 11. Polar positive and negative signals with respect to ground are alternately applied to terminal 10. These signals represent spacing and marking signals respectively. The input is grounded at terminal 11. Terminal 10 is connected to base 14 of transistor Q1 and base 16 of transistor Q2 via resistors R1, R2 respectively. The emitters 22, 24 of the transistors are connected to ground. A D-C power supply which may be two batteries B1, B2 are connected so that the positive terminal of battery B1 and negative terminal of battery B2 are connected to ground at junction point J2. The D-C power supply may be center-tapped 48-volts power supply or two 24-volt batteries. It will be noted that the two batteries are connected with opposite polarity to ground.

The collector 26 of transistor Q1 is connected via resistor R8 to base 30 of transistor Q3. The collector 32 of transistor Q2 is connected via resistor R11 to base 36 of transistor Q4. Resistor R6 is connected between collector 32 and the positive terminal of battery B2. Resistors R7, R9, R10, R12 are connected in series across the batteries B1, B2.

Emitter 46 of transistor Q3 is connected to point P1 between resistors R7, R9. Emitter 48 of transistor Q4 is connected to point P2 between resistors R10, R12. The junction point P3 of resistors R9, R10 is connected to junction point P4 of resistors R15, R16. These resistors are in turn connected to collectors 54, 56 of transistors Q3, Q4 respectively. The collectors 54, 56 are connected via resistors R14, R17 to bases 61, 62 of transistors Q5. Q6 respectively. Emitter 64 of transistor Q5 is connected via resistor R13 to point P1. Emitter 66 of transistor Q6 is connected via resistor R18 to point P2. A resistor R19 is connected between collector 72 and emitter 64. A resistor R20 is connected between collector 76 and emitter 66.

The circuit has one output terminal 80, connected to point P4 via resistor R21, and another output terminal 82 connected to collectors 72 and 76 via resistor R22. A capacitor 86 is connected across the output terminals.

The output of the circuit is applied to a two-wire cable loop L including an ungrounded load 88 and two ungrounded conductors 90, 92 connected to output terminals 80, 82.

Switch SW1 is connected in series with resistor R4 between the junction of resistor R2 and base 16, and the positive terminal of battery B2. Switch SW2 is connected in series with resistor R3 between the junction of resistor R1 and base 14.

In operation of the circuit of FIG. 1, suppose a negative 12-volt signal (negative with respect to ground) is applied to input terminals 10. The signal will be applied to the base emitter junction of PNP transistor Q1 through resistor R1 and this will return through to ground through junction points J1, J2. This will turn transistor Q1 on. The negative potential at terminal 10 back biases the NPN transistor Q2 through resistor R2 and transistor Q2 is turned off. Since transistor Q1 is now fully conductive it presents a ground to resistor R8 at the base of NPN transistor Q3. Transistor Q3 is turned on through resistor R8, the base-emitter junction and resistor R7 to negative battery (−24 volts) at battery B1. This applies negative potential at the collector 54 of transistor Q3 and through the resistors R15 and R21 to output terminal 80.

A current path is provided from the negative terminal of battery B1 through resistors R7, R13, R19, R20, R18, and R12 to the positive terminal of battery B2 and through battery B2 to battery B1. This current causes a voltage drop in resistor R13 which puts the emitter 64 at a slightly more positive potential than base 61 which sees only the drop in fully conductive transistor Q3 through resistor R14. Transistor Q5 is therefore back biased and remains off. The base of transistor Q4 sees positive battery through resistors R11 and R6 since transistor Q2 is held off. A path is provided from positive battery through resistors R12 and R10 to negative battery at point P3 since transistor Q3 has been turned on. The resulting current causes a voltage drop across resistor R12 which makes the emitter 48 of transistor Q4 negative with respect to its base and transistor Q4 is back biased off. The base 62 of transistor Q6 sees a negative potential through resistors R17 and R16 and point P3 and since emitter 66 is at a positive potential, transistor Q6 is turned on. This applies positive potential at the collector 76 of transistor Q6 which reaches circuit terminal 82 via resistor R22. A marking signal represented by a negative potential at terminal 80 is therefore applied to the cable loop L.

When a positive or spacing signal is applied at terminals 10 only, transistor conditions opposite to those described above occur. Transistors Q1, Q3 and Q6 are biased off and transistors Q2, Q4 and Q5 are on. Circuit terminal 80 is now positive through resistor R12, transistor Q4, resistors R16 and R21. Terminal 82 is negative through resistors R7, R13, transistor Q5 and resistor R22. The impedances to ground from the circuit terminals 80, 82 are equal for both marking and spacing conditions.

To summarize the circuit conditions: For marking, negative battery is applied through resistors R7, transistor Q3, resistors R15 and R21 to terminal 80; and positive battery is applied through resistors R12, R18, transistor Q6 and resistor R22 to terminal 82. For spacing, negative battery is applied through resistors R7, R13, transistor Q5 and resistor R22 to terminal 82; and positive battery is applied through resistor R12, transistor Q4 and resistors R16 and R21 to terminal 80.

Capacitor C connected between terminals 80, 82 serves along with the resistors in each current path between battery and the cable loop to shape the wave form applied to the loop so that high frequency signal components which could cause interference to adjacent cable pairs, are attenuated.

If, due to some malfunction in the output signaling equipment, a no-input condition arises at terminals 10, 11, the bases of transistors Q1 and Q2 see positive battery through switch SW1 closed at contact 94 and resistor R4. This positive potential applied through the very high impedance of resistor R4 is enough to turn transistor Q2 on and bias transistor Q1 off, which is the spacing condition for an input spacing signal. This constant spacing condition constitutes a "space-hold" signal applied continuously to the output loop L.

If switch SW1 is opened and switch SW2 is closed, then negative potential will be applied through resistor R3 and switch SW2 to the bases of transistors Q1, Q2 to turn transistor Q1 on and transistor Q2 off. The output loop L will therefore see a continuous marking condition. This constitutes a "mark-hold" signal applied continuously to the output loop.

Figure 2:
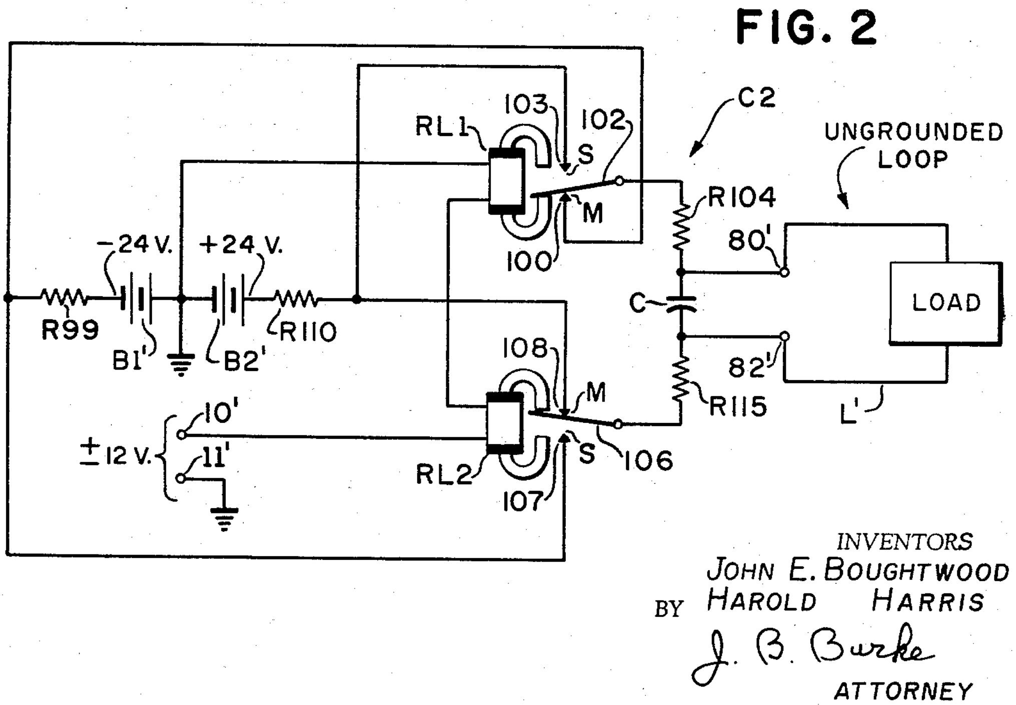
FIG. 2 is a simplified diagram used in explaining the invention.

FIG. 2 illustrates in a simplified manner in circuit C2 the basic electronic switching function performed in circuit C1. The positive and negative input signals are applied to input terminal 10′. Circuit C2 includes relays RL1, R12 connected in series. The output marking signal is applied from ground by battery B1′ through resistor R99, fixed contact 100 and movable contact 102 and output resistor R104 to circuit terminal 80′, then around the loop L′ through resistor R115, movable contact 106, fixed contact 108, resistor R110 and battery B2′ to ground.

When the input signal reverses polarity, relay contacts 102, 103 and 106, 107 close while contacts 102, 100 and 106, 108 open. The output spacing signal is applied from ground by battery B2′ through resistor R110, contacts 103, 102, resistor R104, loop L′, resistor R115, contacts 106, 107, resistor R99 and battery B1′ to ground. The signals applied to the loop L′ actually have a magnitude of the voltage of battery B1′ plus the voltage of battery B2′ (48 volts) balanced to ground at its midpoint, less the voltage drop in the equal resistance paths back to batteries B1′ and B2′. Thus loop L′ is balanced to ground in the amplifier circuit. The circuit C2 presents only the analogy of the electronic double-pole throw switching function performed by circuit C1, without of course the refinements of circuit C1.

It will be understood from the foregoing description that the keying amplifier C1 applies outgoing polar signals which are symmetrical with respect to ground in balanced metallic transmission loop L. In such a circuit configuration, the electric and magnetic fields produced by voltages and currents in one wire of the loop are exactly cancelled by the fields produced in the other wire of the loop. Thus interference to the other conductors in the cable are minimized. Similarly, interferring fields induce identical voltages and currents in each side of the loop which cancel each other at both ends of the loop and so do not affect the signal. The outgoing signals are produced in response to incoming signals which are polar with respect to ground. The keying amplifier includes three pairs of cascaded transistor stages, each stage being connected in complementary symmetry. The signals of alternating positive and negative polarity arrive at input terminal 10, connected in parallel to bases of both transistors of the first pair Q1, Q2 to cause application of signals of opposing polarity to the respective bases of the succeeding transistor pair Q3, Q4 and to cause signals of opposing but inverted polarity to be applied to the bases of the third transistor pair Q5, Q6. The output transmission loops L comprises a pair of conductors 90, 92, with one conductor connected to the collectors in parallel of the second pair of transistors Q3, Q4. The other conductor is connected in parallel to the collectors in parallel of the third pair of transistors Q5, Q6.

The amplifier includes a bridge circuit for producing polarity reversals derived from a center-tapped D-C power supply across the pair of output terminals 80, 82 while maintaining equal impedances between the respective terminals and the grounded center tap. These equal impedances include the second and third cascaded pair of transistor stages Q3, Q4 and Q5, Q6 as above mentioned connected in complementary symmetry. The pair of output terminals 80, 82 are connected respectively to the joined collectors of the transistor pairs in the two stages. The amplifier C1 includes resistors and circuit connections arranged to apply to the bases of the transistors of the second pair Q3, Q4 energizing potentials of equal but opposite polarities.

The impedances to ground from each side of the loop L are equal in the amplifier circuit and remain constant as signal polarity is reversed. The amplifier is further provided with selective mark-hold and space-hold facilities.

In practice the amplifier network described has produced substantially distortionless transmission of mark-space data signals over metallic loops with freedom from interference in adjacent cable loops and circuits.

The entire network can be mounted on a small card and employed as a modular unit for installation at the output of a master data transmitter, transceiver, sending data terminal, transmission station, etc.

We claim:

1. In a keying amplifier for applying outgoing polar signals which are symmetrical with respect to ground to a balanced floating transmission loop in response to incoming signals which are polar with respect to ground, a bridge circuit comprising:

- (a) first and second pairs of transistors connected together in two cascaded stages, each stage being connected in complementary symmetry with respect to ground, each transistor including a base, emitter and collector;
- (b) a direct current power supply having a center tap connected to ground,
  - (1) said power supply having two terminals, with one terminal connected to the emitters of a first transistor in the first stage and the first transistor in the second stage,
  - (2) said power supply having its other terminal connected to the emitters of the second transistors of the first and second stages,
  - (3) the collectors of the transistors in the first stage being connected together,
  - (4) the collectors of the transistors of the second stage being connected together;
- (c) circuit means connected to the bases of the first pair of transistors for applying alternately energizing potentials of equal and opposite polarities with respect to ground,
- (d) and two output terminals,
  - (1) one output terminal being connected to the collectors of the first pair of transistors,
  - (2) the other output terminal being connected to the collectors of the second pair of transistors, so that polarity reversals take place at the output terminals when polarity reversals occur in said energizing potentials while equal impedances are maintained between the respective output terminals and said center tap.

2. A keying amplifier for generating outgoing polar signals which are symmetrical with respect to ground and for applying the outgoing signals to a balanced floating two-wire transmission loop in response to alternating incoming signals which are polar with respect to ground, comprising in combination:

- (a) a first pair of transistors each including a base, emitter and collector with NPN and PNP base-emitter junctions respectively,
  - (1) the emitters being connected together to ground;
- (b) a pair of input terminals for receiving said incoming signals,
  - (1) one of the input terminals being connected to ground,
  - (2) the other of the input terminals being connected to the bases of the transistors;
- (c) a second pair of transistors each including a base, emitter and collector with NPN and PNP base-emitter junctions respectively,
  - (1) the bases of the second transistors being connected to the collectors of the first transistors respectively;

- (d) a direct current power supply having a grounded center tap,
  - (1) the emitters of the second transistors being connected respectively to opposite terminals of the power supply through circuits of equal electrical resistance;
- (e) a pair of transistors each including a base, emitter and collector with NPN and PNP base-emitter junctions respectively,
  - (1) the bases of the third transistors being connected respectively to the collectors of the second transistors,
  - (2) the collectors of the third transistors being connected together,
  - (3) the emitters of the third transistors being connected respectively through circuits of equal resistance to the opposite terminals of the power supply;
- (f) a pair of output terminals,
  - (1) one of the output terminals being connected to the collectors of the third transistors,
  - (2) the other of the output terminals being connected to the collectors of the second transistors through respective equal resistors, whereby when signals of one polarity with respect to ground are applied to the input terminals one transistor in each of the three pairs is rendered conductive while the other transistor in each of the three pairs is rendered non-conductive so that amplified polar potentials which are symmetrical with respect to ground are applied the output terminals with one output terminal being positive with respect to ground and the other output terminal is negative with respect to ground, and whereby when signals of opposite polarity with respect to ground are applied to the input terminals the other transistor in each of the three pairs is rendered conductive while the one transistor in each of the three pairs is rendered non-conductive so that amplified polar potentials which are symmetrical with respect to ground are applied to the output terminals with the one output terminal being negative with respect to ground and the other output terminal being positive with respect to ground, and whereby when said two-wire balanced transmission loop is connected to the output terminals the loop will be grounded only at said center tap.

3. A keying amplifier according to claim 2, further comprising a resistance-capacitance filter connected to said output terminals for suppressing high frequency components occurring when the amplified polar potentials change polarity at the output terminals.

4. A keying amplifier according to claim 2, further comprising two normally open holding circuits respectively connected between the bases of the first pair of transistors and the opposite terminals of said power supply, whereby when one of the holding circuits is closed a continuous positive voltage with respect to ground is applied to the bases of the first transistors in the absence of incoming signals at the input terminals, and whereby when the other holding circuit is closed a continuous negative voltage with respect to ground is applied to the bases of the first transistors so that an amplified potential is continuously applied to the output terminals during the absence of incoming signals at the input terminals.

5. A keying amplifier according to claim 4, further comprising a resistance-capacitance filter connected to said output terminals for supressing high frequency components occurring when the amplified polar potentials change polarity at the output terminals.

6. A keying amplifier according to claim 2 further comprising at least one normally open holding circuit connected between the bases of the first pair of transistors and one terminal of the power supply, whereby when said holding circuit is closed a continuous voltage of one polarity with respect to ground will be applied to the bases of the first pair of transistors in the absence of incoming signals at the input terminals so that an amplified potential is continuously applied to the output terminals.

7. A keying amplifier according to claim 6 further comprising a resistance-capacitance filter connected to said output terminals for suppressing high frequency components occurring when the amplified polar potentials change polarity at the output terminals.

8. In a keying amplifier for generating outgoing polar signals which are symmetrical with respect to ground and for applying the outgoing signals to a balanced floating two-wire transmission loop, a bridge circuit comprising in combination:

(a) a first pair of transistors each including a base, emitter and collector with NPN and PNP base-emitter junctions respectively;

(b) means for applying alternating signals which are polar with respect to ground to the bases of the transistors;

(c) a direct current power supply having a grounded center tap, (1) the emitters of the transistors being connected respectively to opposite terminals of the power supply through circuits of equal resistance;

(d) a second pair of transistors each including a base, emitter and collector with NPN and PNP base-emitter junctions respectively, (1) the bases of the second transistors being connected respectively to the collectors of the first transistors, (2) the collectors of the second transistors being connected together, (3) the emitters of the second transistors being connected respectively through circuits of equal resistance to the opposite terminals of said power supply;

(e) a pair of output terminals, (1) one of the output terminals being connected to the collectors of the first transistors, (2) the other of the output terminals being connected to the collectors of the first transistors through respective equal resistors, whereby when signals of one polarity with respect to ground are applied to the bases of the first transistors, one transistor in each of the two pairs thereof is rendered conductive while the other transistor in each of the two pairs is rendered nonconductive so that amplified polar potentials which are symmetrical with respect to ground are applied to the output terminals with one output terminal being positive with respect to ground while the other output terminal is negative with respect to ground, and whereby when signals of opposite polarity with respect to ground are applied to the bases of the first transistors the other transistor in each of the two pairs is rendered conductive while the one transistor in each of the two pairs is rendered nonconductive so that amplified polar potentials which are symmetrical with respect to ground are applied to the output terminals with the one output terminal being negative with respect to ground and the other output terminal being positive with respect to ground, and whereby when said two-wire balanced transmisson loop is connected to the output terminals the loop will be grounded only at said center tap.

References Cited

UNITED STATES PATENTS 3,078,379 2/1963 Plogstedt et al. ---- 330—14 X

ROY LAKE, *Primary Examiner.*

NATHAN KAUFMAN, *Examiner.*

E. FOLSOM, *Assistant Examiner.*